United States Patent [19]

Yamane et al.

[11] Patent Number: 4,691,269
[45] Date of Patent: Sep. 1, 1987

[54] PWM INVERTER APPARATUS

[75] Inventors: Shigeki Yamane, Fujisawa; Keijiro Mori, Kanagawa; Kyooya Sakamoto, Fujisawa, all of Japan

[73] Assignees: Matsushita Electric Industrial Co., Ltd.; Matsushita Seiko Co., Ltd., both of Osaka, Japan

[21] Appl. No.: 756,987

[22] PCT Filed: Nov. 22, 1984

[86] PCT No.: PCT/JP84/00558
§ 371 Date: Jun. 26, 1985
§ 102(e) Date: Jun. 26, 1985

[87] PCT Pub. No.: WO85/02505
PCT Pub. Date: Jun. 6, 1985

[30] Foreign Application Priority Data

Nov. 28, 1983 [JP] Japan ............... 58-223664
Nov. 28, 1983 [JP] Japan ............... 58-223665

[51] Int. Cl.⁴ .................. H02M 1/12; H02M 7/48
[52] U.S. Cl. .......................... 363/41; 363/98; 363/132

[58] Field of Search ........... 363/17, 41, 98, 131–132; 318/800, 801, 802, 807, 809, 811

[56] References Cited

U.S. PATENT DOCUMENTS

| | | | |
|---|---|---|---|
| 3,970,916 | 9/1976 | Kienscherf | 363/41 X |
| 4,244,016 | 1/1981 | Mitchell | 363/98 |
| 4,377,779 | 3/1983 | Plunkett | 363/41 X |
| 4,516,065 | 5/1985 | Ninomiya et al. | 318/811 |
| 4,546,422 | 10/1985 | Okada | 363/98 X |

Primary Examiner—Peter S. Wong
Attorney, Agent, or Firm—Spencer & Frank

[57] ABSTRACT

This invention relates to a PWM inverter apparatus in which the carrier frequency of the PWM generated voltage is selected to be 8 kHz–16 kHz, and the rotation speed of a motor 9 is controlled so that generated magnetic noise is not audible.

Further, a triangular wave oscillating part 11 varying the frequency in response to a signal from a frequency setting part 1 is provided in a control circuit part 2 to control the rotation speed of the motor 9 so that the generated magnetic noise can be limited to the desired value.

11 Claims, 9 Drawing Figures

PWM INVERTER APPARATUS

BACKGROUND OF THE INVENTION

This invention relates to a PWM inverter apparatus in which an AC voltage having any desired frequency is generated from a DC voltage by PWM switching for controlling the rotation speed of a motor.

An induction motor has the merits of being stout and inexpensive and is presently widely employed, but it has the defect that its rotation speed is principally determined by the frequency of the supplied voltage and is difficult to vary. On the other hand, a variable speed is strongly demanded nowadays for the induction motor (referred to hereinafter as a motor) from the viewpoints of utilities and energy saving, and, as a means for solving this problem, a PWM inverter apparatus is employed in which a commercial AC voltage is converted into a DC voltage, and, by suitable switching, an AC voltage having any desired frequency and voltage is generated again. However, it is known that, when such a PWM inverter apparatus is used, a PWM voltage in a pulse form is generated as an output voltage, and a harmonic current is supplied to the motor, with the result that a force having frequencies two times as high as various harmonic components is generated in the primary windings of the motor, and the laminate forming the stator core of the motor is vibrated to generate magnetic noise. At the same time, bipolar transistors are used presently as switching elements for realizing the DC/AC conversion. In view of the properties of such elements, the upper limit of the carrier frequency of the PWM voltage is about 4 kHz, and a carrier frequency of about 2 kHz is commonly used. Accordingly, the motor generates magnetic noise at 16 Hz–20 kHz, which is in the audible range and which it provides a source of discomfort.

Further, in the PWM signal generating part which generates the PWM voltage, a fundamental wave and a triangular wave providing the carrier frequency are compared to generate the PWM signal for each phase. The ratio ($=a/b$) between the amplitude a of the fundamental wave and the amplitude b of the triangular wave is called the modulation rate m which represents an output voltage relative to an input voltage. There is always the relation $a<b$, and, theoretically, the output voltage generated is the same as the input voltage when $a=b$. In order to efficiently drive the motor, it is necessary to maintain constant the ratio of the output voltage/frequency. Thus, the frequency of the fundamental wave is changed while, at the same time, the amplitude a is changed, and the carrier frequency of the triangular wave is selected to be about 2 kHz so as to drive the motor at about the maximum modulation rate $m=95\%$. However, as described already, noise having a frequency two times as high as the carrier frequency is generated, and, especially, when the motor is driven at a low speed, that is, when the noise of the motor itself is low, magnetic noise is heard to an degree. Therefore, studies have been made to increase the carrier frequency thereby generating magnetic noise which exceeds the audible range of a man. However, when the carrier frequency is increased, the minimum output pulse width at the maximum modulation rate provides a frequency about 20 times as high as the carrier frequency. Accordingly, stable generation of the PWM signal at the high carrier frequency and at the maximum modulation rate of 95% is difficult.

Therefore, it is a first feature of the present invention that a PWM inverter apparatus is provided in which the carrier frequency of the PWM voltage is selected to be 8 kHz–24 kHz. Further, it is a second feature that, in such a PWM inverter apparatus, a PWM voltage whose carrier frequency is changed by a set frequency is generated so as to attain noise-free rotation speed control of the motor.

An embodiment of the present invention will be described with reference to the accompanying drawings.

BRIEF DESCRIPTION OF DRAWINGS

The drawings show an embodiment of the present invention, in which.

DESCRIPTION OF A PREFERRED EMBODIMENT

Figure 1:
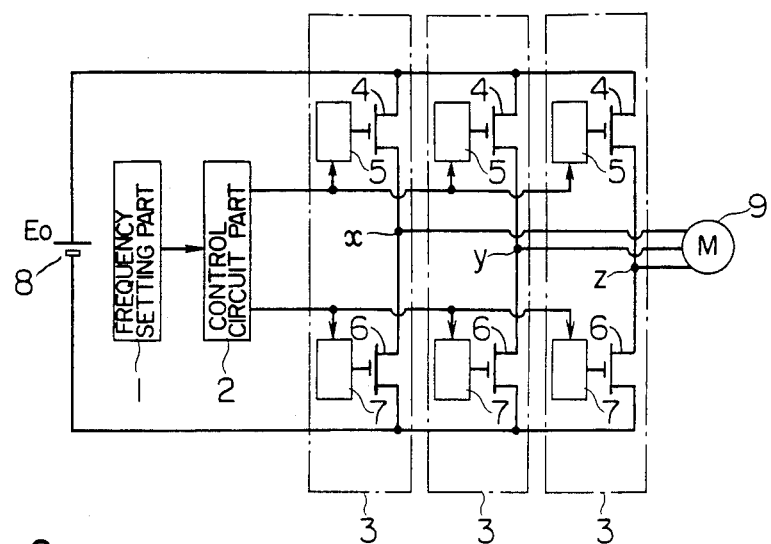
FIG. 1 is a view showing the fundamental structure of the PWM inverter apparatus.

Referring to FIG. 1, 1 designates a frequency which sets part setting the frequency of the output voltage of the PWM inverter apparatus, 2 designates a control circuit part which receives the signal from the frequency setting part 1 and provides output signals of individual phases to gate drive parts, and 3 designates drive parts which constitute the final output parts of the PWM inverter apparatus for effecting the DC/AC conversion. Each phase drive part 3 is composed of a first power switching element 4, a first gate drive part 5, a second power switching element 6, and a second gate drive part 7. Reference number 8 designates a DC power source part connected across the power switching elements 4 and 6 of the individual phase drive parts 3. Reference number 9 designates a motor connected to neutral points x, y and z of the individual phase drive parts 3 to be driven by the output voltages of these parts.

Figure 2:
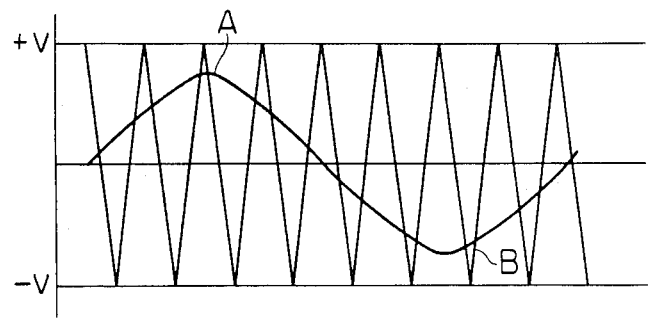
FIG. 2 is a view showing the basic principle of PWM signal generation in the PWM inverter apparatus.
Figure 3:
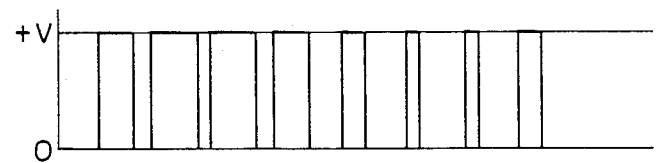
FIG. 3 is a view showing the PWM signal.
Figure 4:
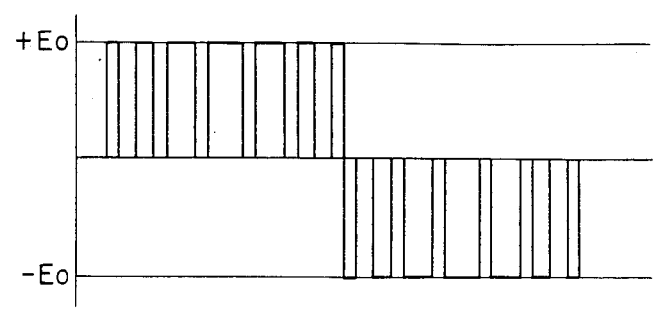
FIG. 4 is a view showing the PWM output voltage.
Figure 5:
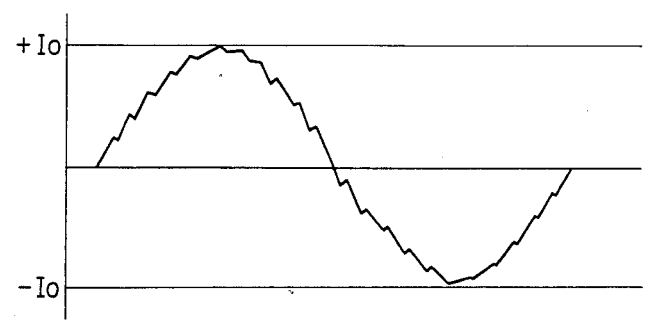
FIG. 5 is a view showing the current supplied to the motor by the PWM inverter apparatus.
Figure 6:
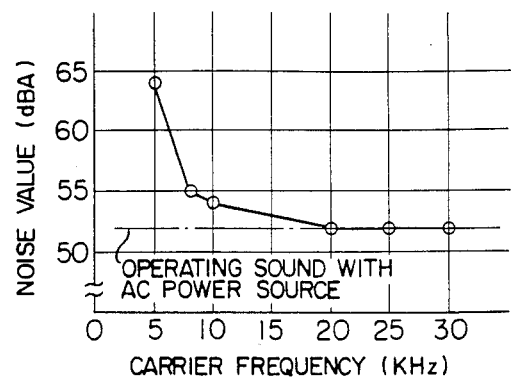
FIG. 6 is a graph showing the noise value relative to a change in the carrier frequency in the PWM inverter apparatus.
Figure 7:
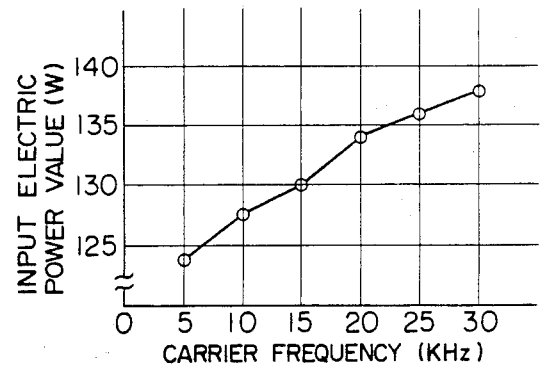
FIG. 7 is a graph showing the inupt electric power value relative to a change in the carrier frequency.

When the frequency is set in the frequency setting part 1, the control circuit part 2 receives the setting signal and generates fundamental waves of the set frequency having a phase interval of 120° in electrical angle. As shown in FIG. 2, the fundamental wave A of one phase at the set frequency is compared with a triangular wave B to generate, for each phase, a PWM signal as shown in FIG. 3. The PWM signals are applied to the first gate drive parts 5 of the individual phase drive parts 3, while, inverted signals of the PWM signals are applied to the second gate drive parts 7, thereby alternately turning the first and second switching elements 4 and 6 on and off. At each of the neutral points x, y and z of the individual phase drive parts 3, an output voltage of the set frequency which is a pulse voltage as shown in FIG. 4, appears and is applied to the motor 9. When the PWM signal voltage shown in FIG. 4 is applied to the motor 9, a current including harmonic components as shown in FIG. 5 is produced in the primary windings of the motor 9 to drive the motor 9. As described already, it is known that the flow of a harmonic current generates magnetic noise having a frequency two times as high as the carrier frequency. The audible range of a man is about 16 Hz–20 kHz. Therefore, when elements capable of high-speed power switching, for example, power MOS FET's, were used as the first and second power switching elements 4 and 6, and the carrier frequency was increased as shown in FIG. 6, it could be confirmed that the noise value was decreased greatly from about 8 kHz, and, at about 24 kHz, became the same as the operating sound generated when the motor was driven by an AC power source. As described above, theoretically, the motor generates magnetic noise having a frequency two times as high as the carrier frequency. Actually, however, noise having the same frequency as the carrier frequency was also generated due to the difference between the characteristics of the individual switching elements and due to external noise. Further, as the carrier frequency is increased as shown in FIG. 6, the switching loss and snubber loss increase to reduce the efficiency. Therefore, when the carrier frequency is selected to lie within the range of 8 kHz–20 kHz, a PWM inverter apparatus can be provided, by which generation in the magnetic noise of the audible range is greatly reduced and reduction of the efficiency is relatively suppressed. When the efficiency is especially noted, an efficient PWM inverter apparatus can be provided, by which generation of the magnetic noise in the audible range is relatively suppressed, by selecting the carrier frequency to lie within the range of 8 kHz–16 kHz. Further, when the generation of the mangetic noise in the audible range is especially noted, a PWM inverter apparatus can be provided, by which the magnetic noise is rendered inaudible and the reduction of the efficiency is relatively suppressed, by selecting the carrier frequency to lie within the range of 16 kHz–24 kHz.

Figure 8:
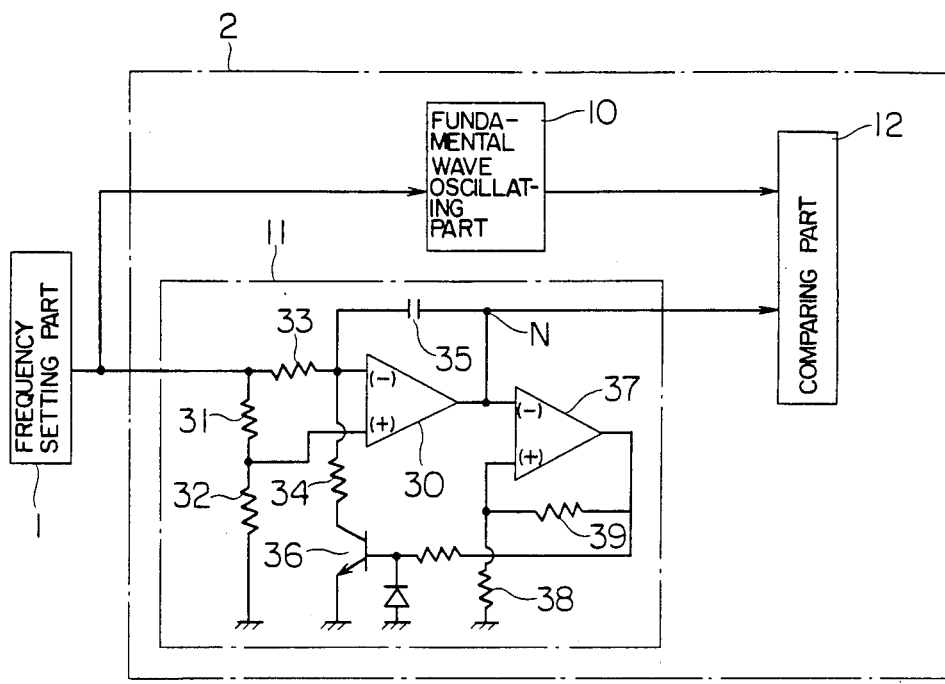
FIG. 8 is a view showing the fundamental structure of the PWM signal generating circuit.

A practical example of the control circuit part 2 for increasing the carrier frequency will now be described with reference to FIG. 8.

Figure 9:
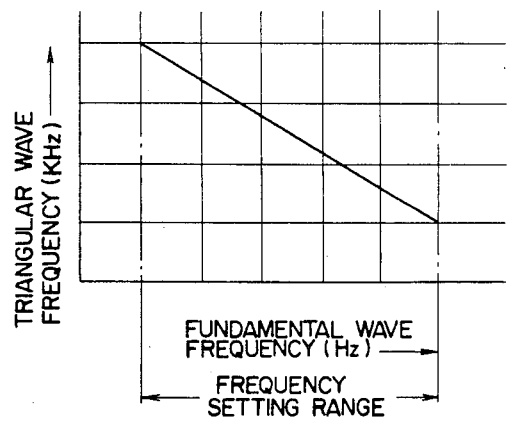
FIG. 9 is a graph showing the carrier frequency relative to a change in the set frequency of the PWM signal generating circuit.

Reference number 1 designates the frequency setting part for setting the frequency of the output voltage of the PWM inverter apparatus, and 2 designates the control circuit part. The control circuit part 2 includes a fundamental wave oscillating part 10, a triangular wave oscillating part 11 for generating a triangular wave of variable frequency in response to the signal from the frequency setting part 1, and a comparing part 12 for generating the PWM signal by comparing the output of the fundamental wave oscillating part 10 and that of the triangular wave oscillating part 11. The triangular wave oscillating part 11 is composed of a first OP amplifier 30, bias resistors 31, 32 for this first OP amplifire 30, charge-discharge resistors 33, 34 for this first OP amplifier 30, an integrating capacitor 35 for the first OP amplifier 30, a charge-discharge switching transistor 36, a second OP amplifier 37, and external resistors 38, 39 for the second OP amplifier 37. When the frequency setting part 1 provides a DC voltage to set the frequency the fundamental wave oscillating part 10 oscillates to produce, a fundamental wave having a frequency and amplitude based on the DC voltage value. At the same time, the setting DC voltage from the frequency setting part 1 is applied to the triangular wave oscillating part 11. This triangular wave oscillating part 11 is a conventional, constant-amplitude variable-frequency triangular wave oscillating circuit, and the voltage obtained by dividing the setting DC voltage value by the resistors 31 and 32 is applied to the positive input terminal of the first OP amplifier 30. The output of the first OP amplifier 30 is negatively fed back through the integrating capacitor 35. The first OP amplifier 30 generates its output so as to maintain the same potential at the negative input terminal. The second OP amplifier 37 compares the output of the first OP amplifier 30 with the voltage between the resistors 38 and 39. When the output of the second OP amplifier 37 is Low, the charge-discharge switching transistor 36 is turned off and the integrating capacitor is charged. When the output potential reaches the potential provided by the external resistors 38 and 39 for the second OP amplifier 37, the output of the second OP amplifier 37 becomes High and the charge-discharge switching transistor is turned on, and the integrating capacitor 35 is discharged. With such a circuit structure, the output N of the first OP amplifier 30 generates a carrier frequency whose amplitude is constant and determined by the potential provided by the external voltage-dividing resistors 38 and 39 associated with the second OP amplifier 37 and which has a relation between it and the setting frequency of the fundamental wave as shown in FIG. 9. This triangular wave and the output of the fundamental wave oscillating part 10 are applied to the comparing part 12 to provide the resultant output. Thus, the carrier frequency is high when the setting frequency is low, while the carrier frequency decreases with an increase in the setting frequency, and a PWM signal achieving the maximum modulation rate of 95% is obtained. Therefore, when the control circuit part is constructed to generate such a PWM signal, the magnetic noise generated by the motor has a frequency which is the same as or two times as high as the carrier frequency. When the rotation speed of the motor becomes still higher, the mechanical sound generated by the motor itself becomes more loud, and the magnetic noise is hardly audible. Therefore, when the motor rotates at a low speed, the carrier frequency is increased to prevent audible magnetic noise from the motor, while, when the motor rotates at a high speed, the carrier frequency is decreased, whereby a PWM inverter apparatus can be provided which can realize the maximum modulation rate of 95%, and in which the audible magnetic noise generated by the motor is cancelled by the mechanical sound from the motor itself. In the embodiment described above, the incremental signal from the frequency setting part 1 acts to decrease the carrier frequency generated by the triangular wave oscillating part 11. This is because a load is considered where the noise value increases with the increase in the rotation speed. However, in the case of any other loads too, the control circuit part may be suitably constructed so that the frequency setting signal can deal with whatever change of the carrier frequency.

As described above, according to the PWM inverter apparatus of the present invention in which the carrier frequency of the PWM generated voltage is selected to lie within the range of 8 kHz–24 kHz, the rotation speed of any induction motor can be controlled so that one generation of audible magnetic noise is greatly reduced, and the reduction of efficiency is relatively small. Also, according to the PWM inverter apparatus in which the carrier frequency of the PWM generated voltage is made variable, a load where the noise value increases with an increase in the rotation speed of the motor can be controlled so that audible magnetic noise is not generated. Also, in any other case, control can be made so as to prevent generation of the magnetic noise when the modulation rate is low and so as to increase the modulation rate when generation of the magnetic noise is allowable to a certain extent. Therefore, the utility of the PWM inverter apparatus can be greatly enhanced.

What we claim is:

1. A PWM inverter apparatus comprising a frequency setting circuit providing a signal to set a frequency; a control circuit generating a PWM signal in response to the signal from said frequency setting circuit, the PWM signal from said control circuit having a carrier frequency which is varied by the signal from said frequency setting circuit, said control circuit including a fundamental wave oscillating circuit generating a fundamental wave having a frequency which increases in response to an incremental change in the signal from said frequency setting circuit, a triangular wave oscillating circuit having a frequency which decreases in response to the incremental change in the signal from said frequency setting circuit, and a comparing circuit comparing the outputs of said fundamental wave oscillating circuit and said triangular wave oscillating circuit; a phase drive circuit receiving the PWM signal from said control circuit to supply power to a motor; and a DC power source connected to said phase drive circuit.

2. A PWM inverter apparatus according to claim 1, wherein said carrier frequency is selected to be 8 kHz–24 kHz.

3. A PWM inverter apparatus according to claim 1, wherein said phase drive circuit is composed of a first and a second power switching element connected in series, and a first and a second gate drive circuit alternately turning on-off said first and second power switching elements in response to the PWM signal from said control circuit, said power switching elements being power MOS.FET's.

4. A PWM inverter apparatus according to claim 1, wherein said carrier frequency is selected to be 8 kHz–16 kHz.

5. A PWM inverter apparatus according to claim 1, wherein said carrier frequency is selected to be 16 kHz–24 kHz.

6. A PWM inverter apparatus for controlling the rotational speed of an induction motor, comprising:
    a plurality of switching elements having respective control electrodes;
    means for supplying DC power, the motor being connected via the switching elements to the means for supplying DC power; and
    speed control means connected to the control electrodes of the switching elements for selectively varying the frequency of the electrical current through the motor, the speed control means including
    frequency setting means for generating a first signal, the first signal being a DC potential which is selectively variable,
    fundamental wave oscillating means, connected to the frequency setting means, for generating a second signal having a sinusoidal waveform and having a frequency that is controlled by the first signal, the fundamental wave oscillating means including means for increasing the frequency of the second signal when the voltage of the first signal is selectively increased,
    additional oscillating means, connected to the frequency setting means, for generating a third signal having a frequency that is controlled by the first signal, the third signal having a triangular waveform and having a frequency that is higher than the frequency of the second signal, the additional oscillating means including means for decreasing the frequency of the third signal when the voltage of the first signal is selectively increased, and
    means responsive to the second and third signals for generating pulse-width modulated signals that are conveyed to the control electrodes.

7. An inverter apparatus according to claim 6, wherein the frequency of the third signal is in the range 8 kHz to 24 kHz.

8. An inverter apparatus according to claim 7, wherein the frequency of the third signal is in the range 8 kHz to 16 kHz.

9. An inverter apparatus according to claim 7, wherein the frequency of the third signal is in the range 16 kHz to 24 kHz.

10. An inverter apparatus according to claim 6, wherein the means for generating pulse-width modulated signals comprises means for comparing the sinusoidal and triangular waveforms.

11. An inverter apparatus according to claim 6, wherein the means for supplying DC power has positive and negative terminals, wherein the switching elements include first and second MOS.FETS's that are connected in series between the positive and negative terminals, the control electrodes of the first and second MOS.FET's being gates, wherein the motor has a winding that is connected to the first and second MOS.FET's at an intermediate connection point between the first and second MOS.FET's, and wherein the means for generating pulse-width modulated signals comprises means connected to the gates of the first and second MOS.FET's for alternately turning the first and second MOS.FET's ON and OFF.

* * * * *